(12) United States Patent
Guo et al.

(10) Patent No.: US 10,923,101 B2
(45) Date of Patent: *Feb. 16, 2021

(54) PAUSING SYNTHESIZED SPEECH OUTPUT FROM A VOICE-CONTROLLED DEVICE

(71) Applicant: International Business Machines Corporation, Armonk, NY (US)

(72) Inventors: Shang Qing Guo, Cortlandt Manor, NY (US); Jonathan Lenchner, North Salem, NY (US)

(73) Assignee: International Business Machines Corporation, Armonk, NY (US)

(*) Notice: Subject to any disclaimer, the term of this patent is extended or adjusted under 35 U.S.C. 154(b) by 360 days.

This patent is subject to a terminal disclaimer.

(21) Appl. No.: 15/854,309

(22) Filed: Dec. 26, 2017

(65) Prior Publication Data
US 2019/0198008 A1 Jun. 27, 2019

(51) Int. Cl.
*G10L 15/22* (2006.01)
*G10L 15/26* (2006.01)
(Continued)

(52) U.S. Cl.
CPC .......... *G10L 13/02* (2013.01); *B25J 9/0003* (2013.01); *B25J 11/0005* (2013.01);
(Continued)

(58) Field of Classification Search
CPC .................................................. G10L 15/22
(Continued)

(56) References Cited

U.S. PATENT DOCUMENTS

| | | | |
|---|---|---|---|
| 6,363,301 B1 | 3/2002 | Tackett et al. | |
| 6,967,455 B2 * | 11/2005 | Nakadai | B25J 13/00 318/567 |

(Continued)

FOREIGN PATENT DOCUMENTS

| | | |
|---|---|---|
| EP | 2933071 | 10/2015 |
| WO | 2013168363 | 11/2013 |
| WO | 2016174594 | 11/2016 |

OTHER PUBLICATIONS

Bidwell, J., "Measuring Operator Anticipatory Inputs in Response to Time-delay for Teleoperated Human-robot Interfaces", Proceedings of the ACM CHI Conference on Human Factors in Computer Interaction, Apr. 26-May 1, 2014.
(Continued)

*Primary Examiner* — Bhavesh M Mehta
*Assistant Examiner* — Timothy Nguyen
(74) *Attorney, Agent, or Firm* — Fleit Intellectual Property Law; Jon Gibbons

(57) ABSTRACT

A system, a computer program product, and method for controlling synthesized speech output on a voice-controlled device. The voice-controlled device recognized that speech input is being received. The voice-controlled device outputs synthesized speech based on the speech input. While outputting synthesized speech based on the audio is captured. The voice-controlled device recognized the audio input as speech and pausing the outputting of synthesized speech. Otherwise, in response to the captured audio not being recognized as speech and above a settable background noise threshold, pausing the outputting of synthesized speech. The paused output of speech based on the synthesized speech input is resumed after the pausing of the output of synthesized speech being within a settable pause timeframe.

20 Claims, 11 Drawing Sheets

(51) Int. Cl.
  *G10L 15/18* (2013.01)
  *G06F 3/16* (2006.01)
  *G10L 15/08* (2006.01)
  *G10L 21/0208* (2013.01)
  *G10L 13/02* (2013.01)
  *B25J 9/00* (2006.01)
  *B25J 11/00* (2006.01)
  *B25J 13/00* (2006.01)
  *G10L 25/84* (2013.01)
  *G10L 13/00* (2006.01)

(52) U.S. Cl.
  CPC ............ *B25J 13/003* (2013.01); *G06F 3/165* (2013.01); *G10L 15/18* (2013.01); *G10L 15/22* (2013.01); *G10L 15/26* (2013.01); *G10L 13/00* (2013.01); *G10L 25/84* (2013.01); *G10L 2015/088* (2013.01); *G10L 2021/02087* (2013.01)

(58) Field of Classification Search
  USPC .......................................................... 704/258
  See application file for complete search history.

(56) References Cited

U.S. PATENT DOCUMENTS

| | | | | |
|---|---|---|---|---|
| 2003/0139851 A1* | 7/2003 | Nakadai | ............ | G10L 21/0208 700/258 |
| 2003/0152261 A1* | 8/2003 | Hiroe | ............ | G10L 13/047 382/153 |
| 2003/0171850 A1* | 9/2003 | Kobayashi | ............ | G10L 13/033 700/272 |
| 2006/0200345 A1* | 9/2006 | Kooiman | ............ | G10L 15/20 704/233 |
| 2009/0099849 A1* | 4/2009 | Iwasawa | ............ | G10L 15/22 704/275 |
| 2012/0278074 A1* | 11/2012 | Burke | ............ | G10L 15/10 704/235 |
| 2013/0094656 A1 | 4/2013 | Fung | | |
| 2013/0262096 A1* | 10/2013 | Wilhelms-Tricarico | ............ | G10L 25/30 704/202 |
| 2014/0019136 A1* | 1/2014 | Tanaka | ............ | G10L 13/00 704/260 |
| 2014/0095007 A1 | 4/2014 | Angle et al. | | |
| 2014/0136207 A1* | 5/2014 | Kayama | ............ | G10L 13/08 704/258 |
| 2015/0039311 A1* | 2/2015 | Clark | ............ | G10L 15/063 704/244 |
| 2015/0120060 A1 | 4/2015 | Yamashita et al. | | |
| 2015/0348548 A1* | 12/2015 | Piernot | ............ | G06F 3/013 704/235 |

OTHER PUBLICATIONS

Holden, J., "Meet the robot that pretends to listen", TechCrunch, May 7, 2016, https://techcrunch.com/2016/05/07/meettherobot-thatpretendstolisten/, pp. 1-4.

\* cited by examiner

PAUSING SYNTHESIZED SPEECH OUTPUT FROM A VOICE-CONTROLLED DEVICE

BACKGROUND

The present invention generally relates to voice-controlled devices and more specifically relates to controlling synthesized speech output therefrom.

Speech recognition systems are rapidly increasing in significance in many areas of data and communications technology. In recent years, speech recognition has advanced to the point where it is used by millions of people across various applications. Speech recognition applications now include interactive voice response systems, voice dialing, data entry, dictation mode systems including medical transcription, automotive applications, etc. There are also "command and control" applications that utilize speech recognition for controlling tasks such as adjusting the climate control in a vehicle or requesting a smart phone to play a particular song.

Voice controlled devices, such as robots, smart speakers, intelligent personal assistants are typically placed in an environment where there are humans. Other voice controlled devices may also be present. These voice controlled devices face several obstacles about when to speak or respond. For example the voice controlled devices may hear an utterance and not know for sure whether the utterance is directed to it or not. Likewise the voice controlled devices may be in the presence of one or more people and not know whether or not it is appropriate to start up a conversation. Further the voice controlled devices may start speaking and while speaking it may discern a human or another voice controlled device speaking. Given these obstacles, the voice controlled device may not know whether the right thing is to continue or stop speaking. Voice controlled devices have been very poor at properly sizing up such situations and dealing with them effectively.

SUMMARY

A system, a computer program product, and method for controlling synthesized speech output on a voice-controlled device. The voice-controlled device recognized that speech input is being received. The voice-controlled device outputs synthesized speech based on the speech input. While outputting synthesized speech based on the audio is captured. The voice-controlled device recognized the audio input as speech and pausing the outputting of synthesized speech. Otherwise, in response to the captured audio not being recognized as speech and above a settable background noise threshold, pausing the outputting of synthesized speech. The paused output of speech based on the speech input is resumed after the pausing of the output of synthesized speech being within a settable pause timeframe.

Further, once the voice-controlled device begins outputting synthesized speech it may sense other audio input. If the audio input is a person, the voice-controlled device pauses the output of synthesized speech. The voice-controlled device may apologize after pausing. In another example the voice controlled device senses that the ambient noise is above a given decibel level and it pauses the output of synthesized speech. Again it may apologize for pausing. After the audio input abates, the voice-controlled device may resume outputting synthesized speech.

One or more sensors are used to detect whether one person or more than one person is within a first settable distance from the voice-controlled device. Next a determination is made whether the audio input received is recognized as speech. In response to only one person being detected within the settable distance, it begins outputting synthesized speech based on the audio input without waiting for an attention word to be recognized and otherwise waiting for additional criteria before outputting synthesized speech based on the speech input. The additional criteria include determining that more than one person is detected and recognizing that the attention word is received before outputting synthesized speech based on the audio input.

Another criterion includes more than one person being detected and determining that the person is looking at the voice-controlled device before outputting synthesized speech based on the audio input. The person looking at the voice-controlled device in one example is approximately the same distance to the voice-controlled device as others in the group. In another example, the person looking at the voice-controlled device is closer than others in the group e.g. a teacher in a classroom of students.

BRIEF DESCRIPTION OF THE DRAWINGS

In the accompanying figures, like reference numerals refer to identical or functionally similar elements throughout the separate views. The accompanying figures, together with the detailed description below are incorporated in and form part of the specification and serve to further illustrate various embodiments and to explain various principles and advantages all in accordance with the present invention, in which.

DETAILED DESCRIPTION

Figure 1:
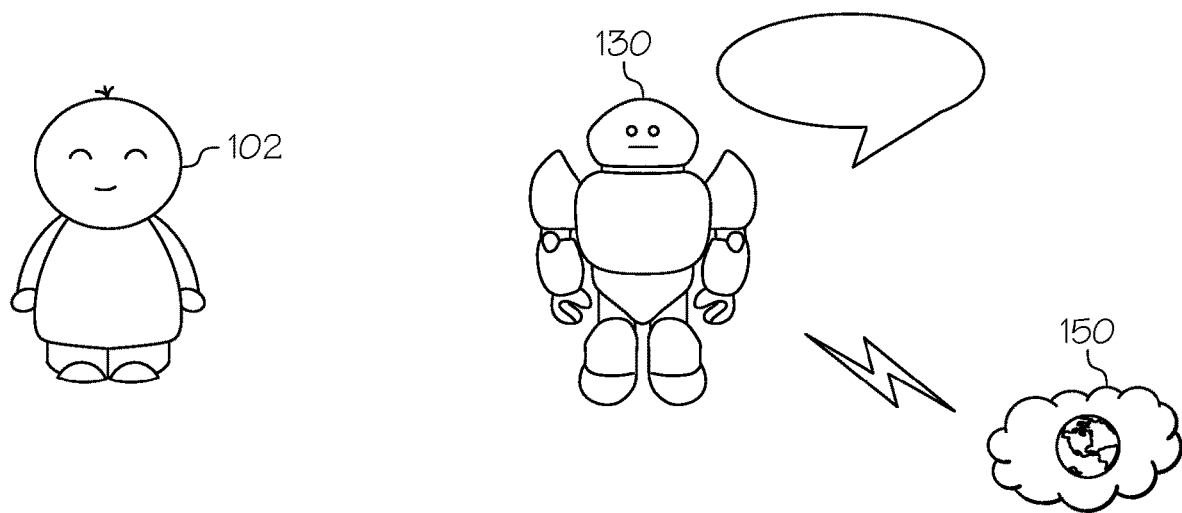
FIG. 1 is a diagram of a person within a distance to a voice-controlled device, such as a robot.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention is presented for purposes of illustration and description, but is not intended to be exhaustive or limited to the invention in the form(s) disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. The terminology used herein is for the purpose of describing particular embodiments only and is not intended to be limiting of the invention.

The present invention improves making human to voice-controlled device conversations more natural. The problem associated with voice-controlled devices include whether to proactively speak when detecting no one is talking (e.g. to start up a conversation), and whether the voice-controlled should automatically stop talking when it hears someone starting to talk.

The present invention provides a method and apparatus to make human to voice-controlled device conversations more natural. In one example the voice-controlled device uses the voice-controlled device's vision and audio system in conjunction with the natural language classification (NLC) capability to determine when to speak.

The present invention uses at least two distance thresholds. The first distance threshold is a conversation distance (CD), which is the distance between the closest person and the voice-controlled device when the voice-controlled device detects there are multiple parties present. The second distance threshold is a one-to-one conversation distance (1-1 CD)—a very close distance typical of sustained one-on-one conversation. The voice-controlled device convention, which is typical in human-voice-controlled device conversation, is, by default, to require an "attention word" which is generally taken to be the voice-controlled device's name. In many cases the voice-controlled device will not respond unless it hears its name first. However, in sustained back and forth conversation it can become tiring to always use the voice-controlled device's name (or other attention word) in every single utterance.

The present invention checks the following criteria to determine whether to respond to a question or other utterance:

1. In response to the voice-activated device detecting that there is just one other person present, then no attention word is required.
2. In response to more than one person being detected, then an attention word is required.
3. In response to more than one person being detected, and one person (e.g. the speaker) being within the one-to-one conversation distance (1-1 CD), and having made eye contact with the voice-controlled device, than don't require an attention word.

In the case in which the voice-controlled device has high confidence in its response to the question/other utterance (i.e. the top confidence returned from the national language classifier (NLC) service exceeds a threshold) but there is not a match to any of the cases above, and there is a pause in the conversation, the voice-controlled device, such as a robot, may raise its hand, makes one of several different possible attention-getting sounds, i.e. saying "hmmm" or "yes," or making a voice clearing sound), and then respond. In this case, the voice-controlled device, e.g., a robot, reasons that it has an answer or other contribution, even though it is not specifically the target of the conversation.

In the case of problem (2) above, the voice-controlled device considers two cases, when it believes it is in the company of a single other person, or many other people. Conversation starting is more common in the first case, but nonetheless the analyses of the cases are roughly analogous. Consider the case of a single other person first. The voice-controlled device has a series of conversation starting utterances (i.e. "How are you today?", "Do you happen to know what the weather is like today?' and "Pleased to meet you, my name is Rosie").

These various conversation starting utterances are broken into somewhat overlapping groups as will be described in a moment. Before starting the conversation the voice-controlled device will do a facial recognition (if possible, i.e. enough of the person's face is visible) to determine if it believes it (1) it knows who the person is, (2) it believes it has never seen the person before, or (3) it believes it has seen the person before but has not interacted with the person, or (4) believes it has seen the person before, has interacted with the person, but does not know their name. The different+ conversation starters are grouped as being appropriate to one or more of these four situations. The voice-controlled device begins a conversation (using a random one of the appropriate conversation starters) only in the case that the voice-controlled device detects the single other person in its proximity (i.e. within a threshold number of feet) and the voice-controlled device believes the human has not spoken for some minimum amount of time.

In the case of a group of people the conversation starting conventions are similar. The voice-controlled device has conversation starters that are reserved for groups that it believes it doesn't know and those that it believes it does know. It will glance at the group members and do face recognition. If it recognizes at least one face, it will assume the group is a known group and resort to conversation starters appropriate to known groups. Otherwise it will resort to conversation starters for unknown groups. The conversations starters are considerably different in these two cases. In the case of a group the voice-controlled device does not require complete quiet to begin, but does require that spoken words not be recognized with high confidence within a threshold amount of time. Moreover, when the voice-controlled device speaks, it directs its speaking to the person that it believes is closest to it.

In case (3) the voice-controlled device uses a time threshold T of approximately one second. If the human speaker begins speaking within time T and the speaking is comprehensible by the voice-controlled device (i.e. can with reasonably high confidence be transcribed, as opposed to some new background noise), the voice-controlled device will stop speaking. If all that is detected is background noise it will be ignored as long as the noise level is below some threshold number of decibels. If above the threshold the voice-controlled device will again pause, and pick up again once the noise level has lowered to below the threshold level.

To make human-voice-controlled device dialog/conversation more natural, the present invention in one example uses the voice-controlled device's vision and audio system in conjunction with the natural language classification (NLC) capability to determine:
1. Whether the voice-controlled device should respond when hearing a question/other utterance;
2. Whether to proactively speak when detecting no one is talking (e.g. to start up a conversation), and
3. Whether the voice-controlled device should automatically stop talking when it hears someone starting to talk.

Non-Limiting Definitions

The terms "a", "an" and "the" are intended to include the plural forms as well, unless the context clearly indicates otherwise.

The phrase "attention word" means a single word or phrase specifically used to get the attention of the voice controlled device.

The terms "comprises" and/or "comprising," when used in this specification, specify the presence of stated features, steps, operations, elements, and/or components, but do not preclude the presence or addition of one or more other features, integers, steps, operations, elements, components, and/or groups thereof.

The term "natural language classifier (NLC)" is a service to determine the intent of any given text by identifying its classification with corresponding confidence values.

The term "sensor" means a device which detects and captures information, for example, devices which detect and capture visual imagery such as, but not limited to, a visible light camera, an infra-red sensor, a depth sensor (e.g., Microsoft Kinect™), laser pulse-based radar sensor, an acoustical sensor, or a combination thereof.

Synthesized Speech Output from a Voice Controlled Device

Shown are three scenarios which will be further described with respect to the flow diagrams FIG. 4 to FIG. 8 below. FIG. 1 is a diagram of a person 102 within a distance (D1) to a voice-controlled device 110, such as a robot, which is optionally wirelessly coupled to a network 150, such as the Internet.

Figure 2:
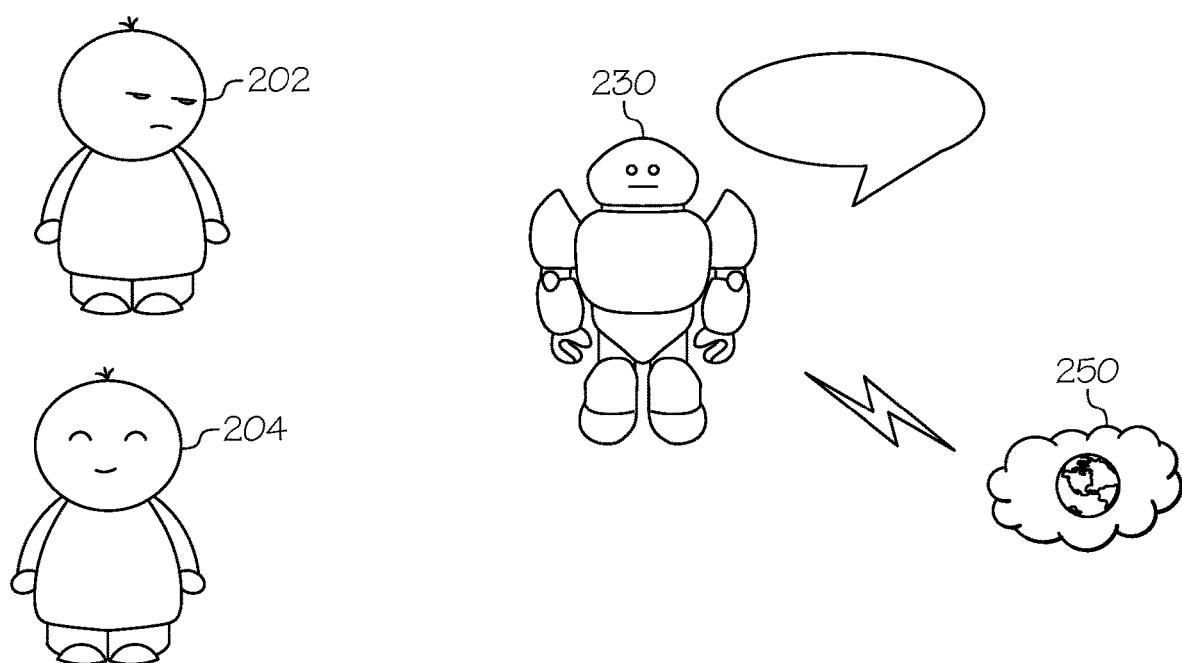
FIG. 2 is a diagram of two people within a distance to a voice-controlled device, such as a robot with one of the humans looking at the voice-controlled device.

First Scenario: Determine if the Utterance is Meant for the Voice Controlled Device FIG. 2 is a diagram of two people 202, 204 within respective distances (D2, D3) to a voice-controlled device 210, such as a robot with one of the humans 202 looking at the voice-controlled device 210, which is optionally wirelessly coupled to a network 250, such as the Internet.

Figure 3:
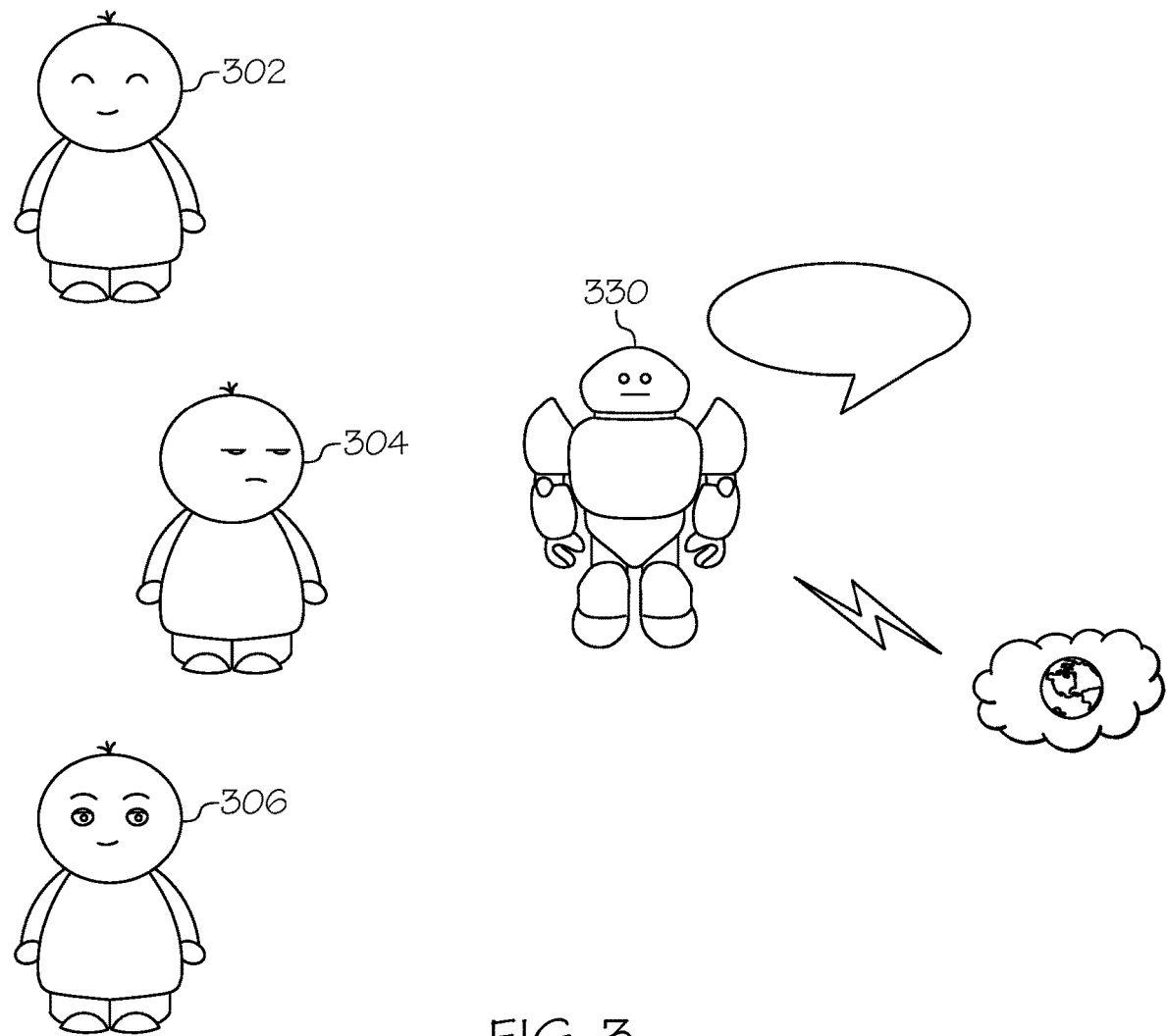
FIG. 3 is a diagram of three people, each within a distance to a voice-controlled device, such as a robot, with one of the humans looking at the voice-controlled device.

FIG. 3 is a diagram of three people 302, 304, 306, each within respective distances (D4, D5, D6) to a voice-controlled device 330, such as a robot, with one of the humans 304 looking at the voice-controlled device 330, which is optionally wirelessly coupled to a network 250, such as the Internet.

Figure 4:
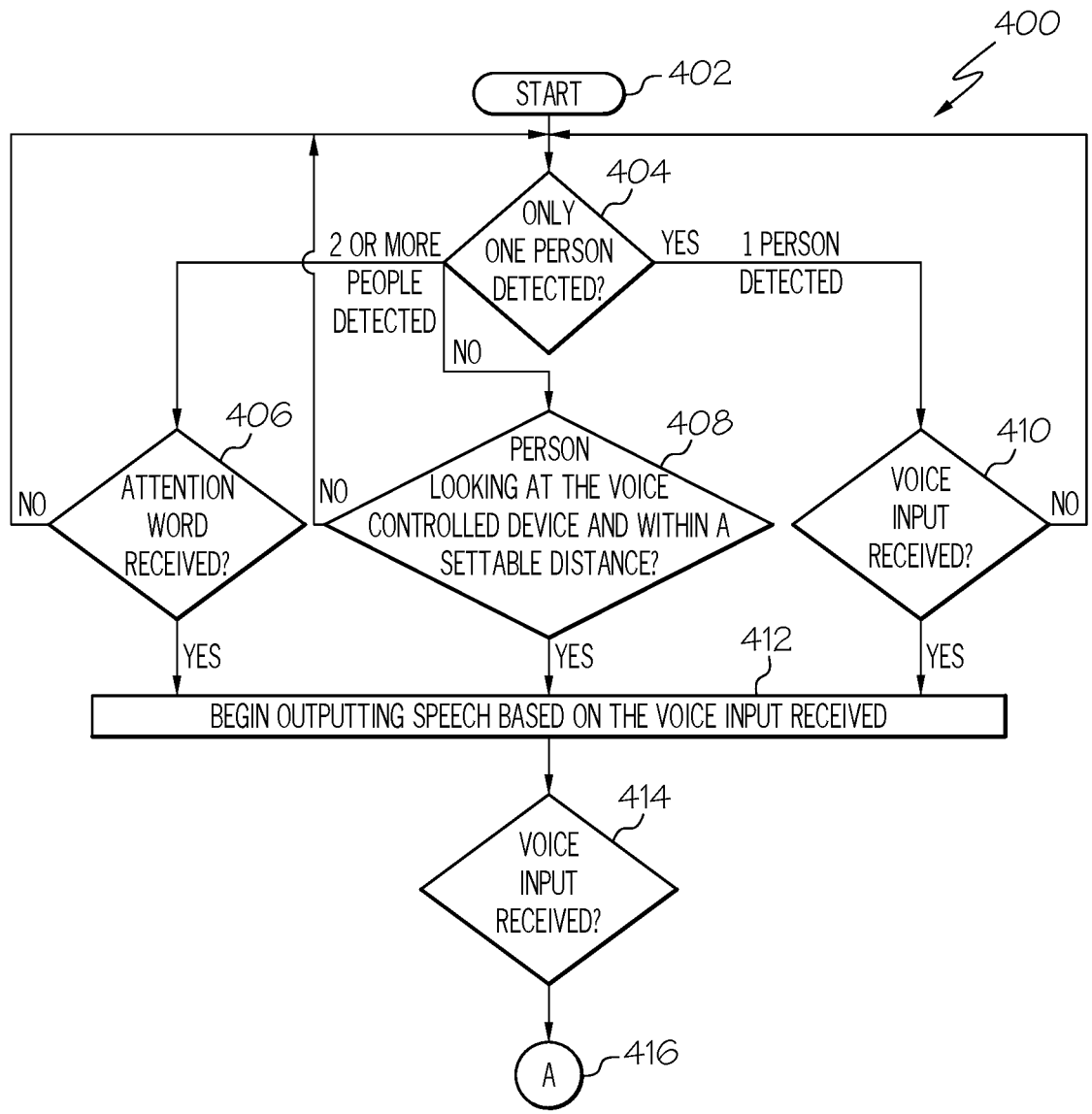
FIG. 4 and FIG. 5 are flow charts of a voice controlled device initiating conversation based on a number of people nearby.
Figure 5:
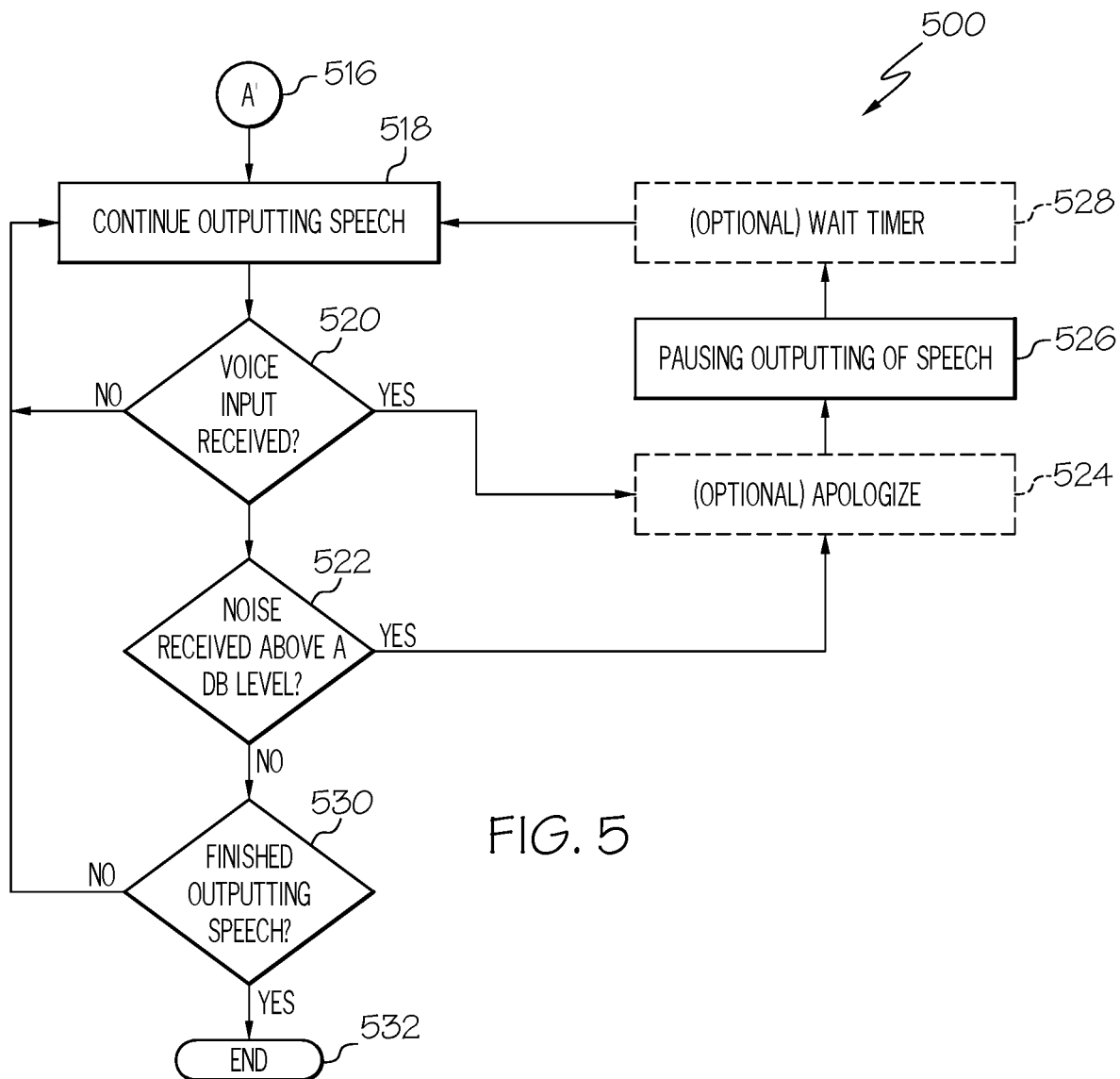

FIG. 4 and FIG. 5 are flows charts 400, 500 to determine when a voice-controlled device 130, 230, 330 should speak based on a number of people nearby with respect to FIG. 1 and FIG. 3 above. The process starts at step 402 and immediately flows to step 404.

In step 404, a determination is made using one or more sensors, if one person or more than one person is detected within the vicinity of the voice-controlled device 130, 230, 330. The number of people detected controls which of three steps 406, 408, and 410 are followed. These three steps are further described below.

A sensor or sensors are used to detect if a person is within the vicinity of a voice-controlled device 130, 230, 330. Sensors which detect and capture information on a distance to a person. Various sensors include a visible light camera, an infra-red sensor, a depth sensor (e.g., Microsoft Kinect™), laser pulse-based radar sensor, an acoustical sensor, or a combination thereof. If the determination is made that only one person is present within a distance (D) within a given confidence level, the flow continues to step 410. Otherwise when more than one person is detected within a given distance with a given confidence level, the process flows to the two steps 406 and 408.

In step 410, when only one person is detected, a determination is made whether the audio input received is speech. In the case where it is determined within a given confidence level to be speech, the process continues to step 412 further describe below. This is the case in which the voice-controlled device 130, 230, 330 has a confidence level that there is only one person nearby and the person spoke. Otherwise in the case where the attention word is not received, the process loops back to step 402.

In step 406, a determination is made if an attention word is received when a group of two or more persons is present within a given distance (D1, D2, . . . Dn). In response to the attention word being received, the flow continues to step 412 further described below. This is the case in which the voice-controlled device 130, 230, 330 has confidence level there are two or more persons nearby and a person is looking at the voice-controlled device 130, 230, 330. Otherwise in the case where more person is not looking at the device, the process loops back to step 402.

In step 408, a determination is made if one in the group of two or more persons nearby 202 is looking at the voice-controlled device 130, 230, 330 within a given distance (D). In response to the person looking at the voice-controlled device 130, 230, 330, the flow continues to step 412 further described below. This is the case in which the voice-controlled device 130, 230, 330 has confidence there is two or more persons nearby and an attention word was received. Otherwise in the case where the audio input is not determined to be speech, the process loops back to step 402.

In step 412 the voice-controlled device 130, 230, 330 begins outputting synthesized speech because the confidence levels for one of the three paths above 406, 408 and 410 were high enough regarding the number of people nearby and other criteria. The process flows to node A at step 416 which continues to node A' at step 516 in FIG. 5. The synthesized speech from step 412 continues in step 518. If audio input is received, a test is made if further voice input is received in step 520. In the case that voice input is received the process flows to step 524. Otherwise, in response to voice not being detected, the process continues to step 522.

In step 522 a test is made if the audio input is above a given loudness or decibel (dB) level. In the case the noise level is above a settable threshold, the process flows to step 524. In step 524 an optional step (denoted by the dashed lines), the voice-controlled device 130, 230, 330 apologizes. The apology is because either the voice-controlled device 130, 230, 330 was speaking and received voice input to be polite or the voice-controlled device 130, 230, 330 sensed noise is above a given dB level threshold. The voice-controlled device pauses the output of synthesized speech in step 526. The process continues to step 528. Otherwise, the process flows to step 530.

The process flows to step 530. A test is made if there is more synthesized speech to output. If synthesized speech is finished, the process terminates in step 532. Otherwise with more synthesized speech to output, the process loops back to step 518.

Step 528 is an optional step of a wait timer. The timer is set for a predetermined time before looping back to continue the output of synthesized speech in step 518.

Second Scenario: Initiating a Conversation from a Voice Controlled Device

Figure 6:
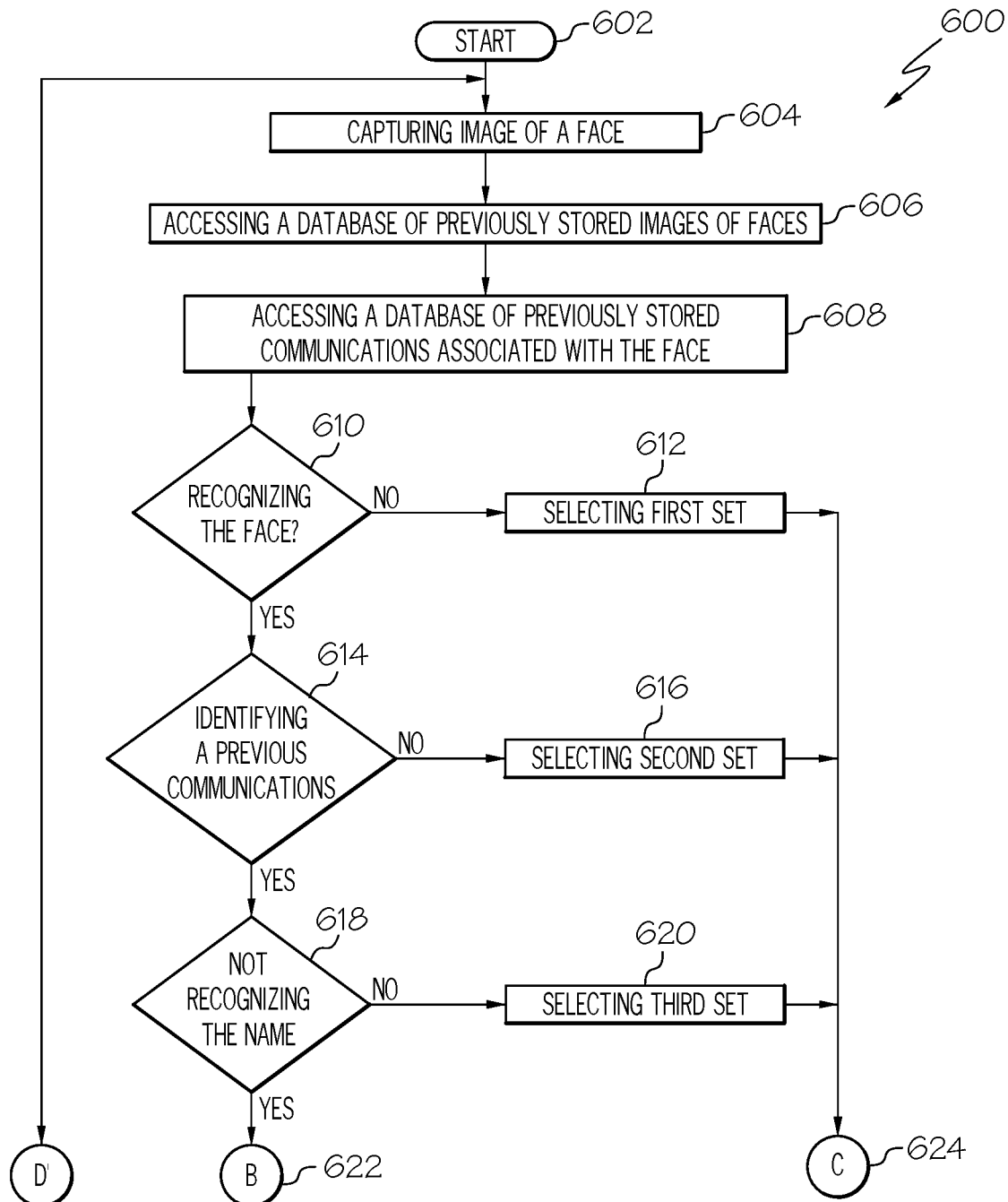
FIG. 6 and FIG. 7 are flow charts of a voice controlled device initiating conversation based on a recognizing a person nearby.
Figure 7:
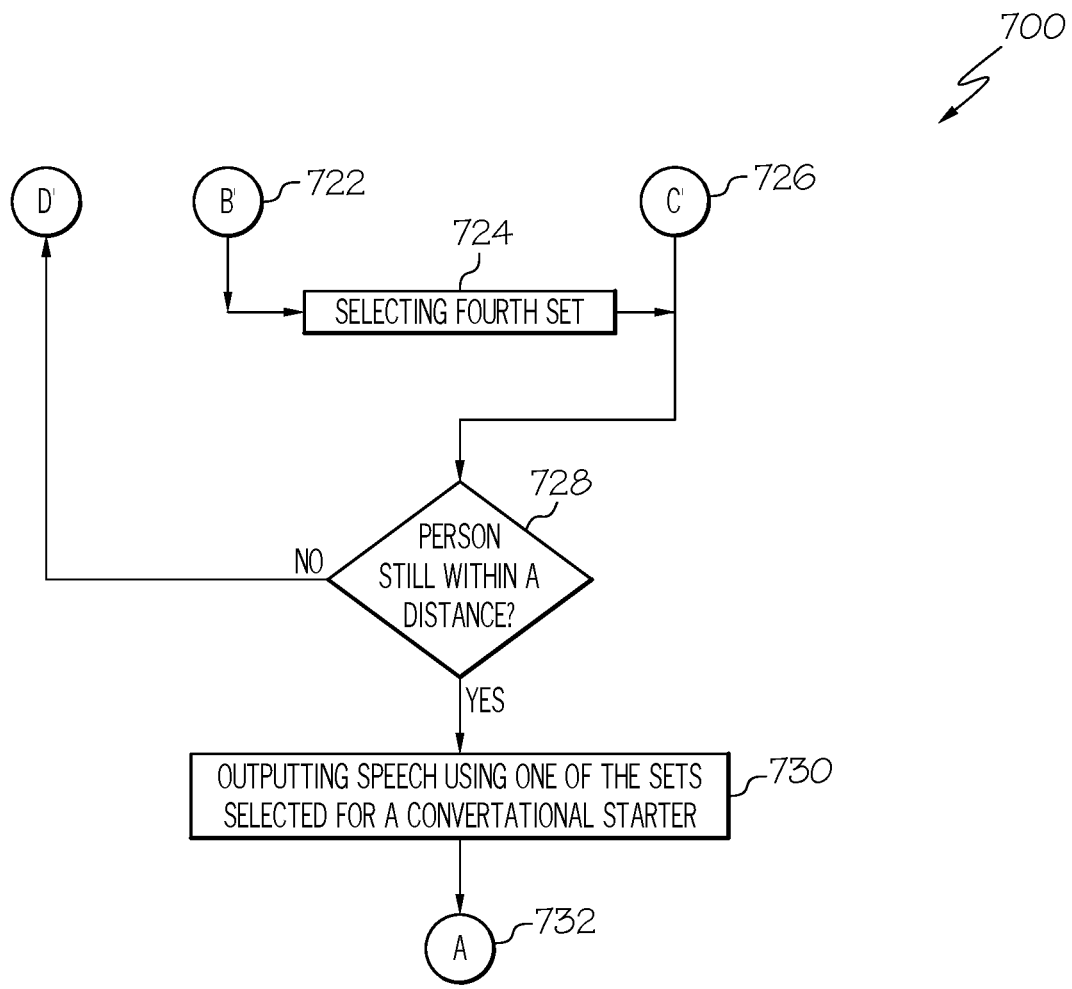

FIG. 6 and FIG. 7 are a flow charts 600, 700 of a voice-controlled device 130, 230, 330 initiating conversation based on a recognizing a face of a person nearby. The process starts in step 602 and immediately flows to step 604 in which an image of a face is captured. Sensors which detect the image of face include a visible light camera, an infra-red sensor, or a combination thereof. The process continues to step 606.

In step 606 the voice-controlled device accesses a database of previous stored images (not shown). This database can be public database, a private database or a combination of both. A social media database may also be used. The process continues to step 608.

In step 608 the voice-controlled device 130, 230, 330 accesses a database of previous communications associated with the image (not shown). In one example, these previous communications are communications with the voice-controlled device 130, 230, 330. In another example, these previous communications are communications not with the voice-controlled device 130, 230, 330, but rather communications that are mined through other services such as blogs, social media, websites, and more. This can be the same database with the previous stored images or a separate database. This can be public database, a private database or a combination of both. A social media database may also be used. The process continues to step 610.

In step 610 a test is made to see if the captured face is recognized. In the case it is not recognized a first set of conversational starters is selected in step 612. The process continues to node C step 624 which continues to node C' at step 726 in FIG. 7. Otherwise the process continues to step 614. The first set of conversational starters are general items, such as, "Looks like rain today", or "Only one more day till the weekend!".

Step 614 is entered because the face was recognized in step 610. Next a test is made to determine if a previous communication associated with the face can be found. In the case the previous conversation is not found for the recognized face a second set of conversational starters is selected at step 616. The second set of conversational starters are more specific to the face recognized, such as, "I like your hat", or "Nice glasses!". The process continues to node C step 624 which continues to node C' at step 726 in FIG. 7. Otherwise the process continues to step 618.

Step 618 is entered because the face was recognized and there was a previous communication found in steps 610 and 614. Next a test is made to determine if a name can be associated with the recognized face. In the case the name is not found for the recognized face a third set of conversational starters is selected in step 620. The third set of conversational starters are even more specific to the face recognized and previous conversation, such as, "Are you still following the basketball series?", or "It has been awhile since I have seen you, how are things?". The process continues to node C step 624 which continues to node C' at step 726 in FIG. 7. Otherwise the process continues to node B step 622 which continues to node B' at step 722 in FIG. 7.

Step 722 is where the face is recognized, previous communications identified and the name of the person found, the process continues to step 724, in which a fourth set of conversational starters is selected. The fourth set of conversational starters are even more specific to the face recognized and previous conversation, such as, "Jon are you still following the basketball series?", or "Sally—is that a new hat that you have on today?". The process flows to step 728.

In step 728, if a person is still within a distance (D), the voice-controlled device 130, 230, 330 initiates a conversation using the one of the previous set of conversational starters. The process then flow to step 732 node A which flows into node A' in FIG. 5.

Third Scenario: Pausing a Conversation

Figure 8:
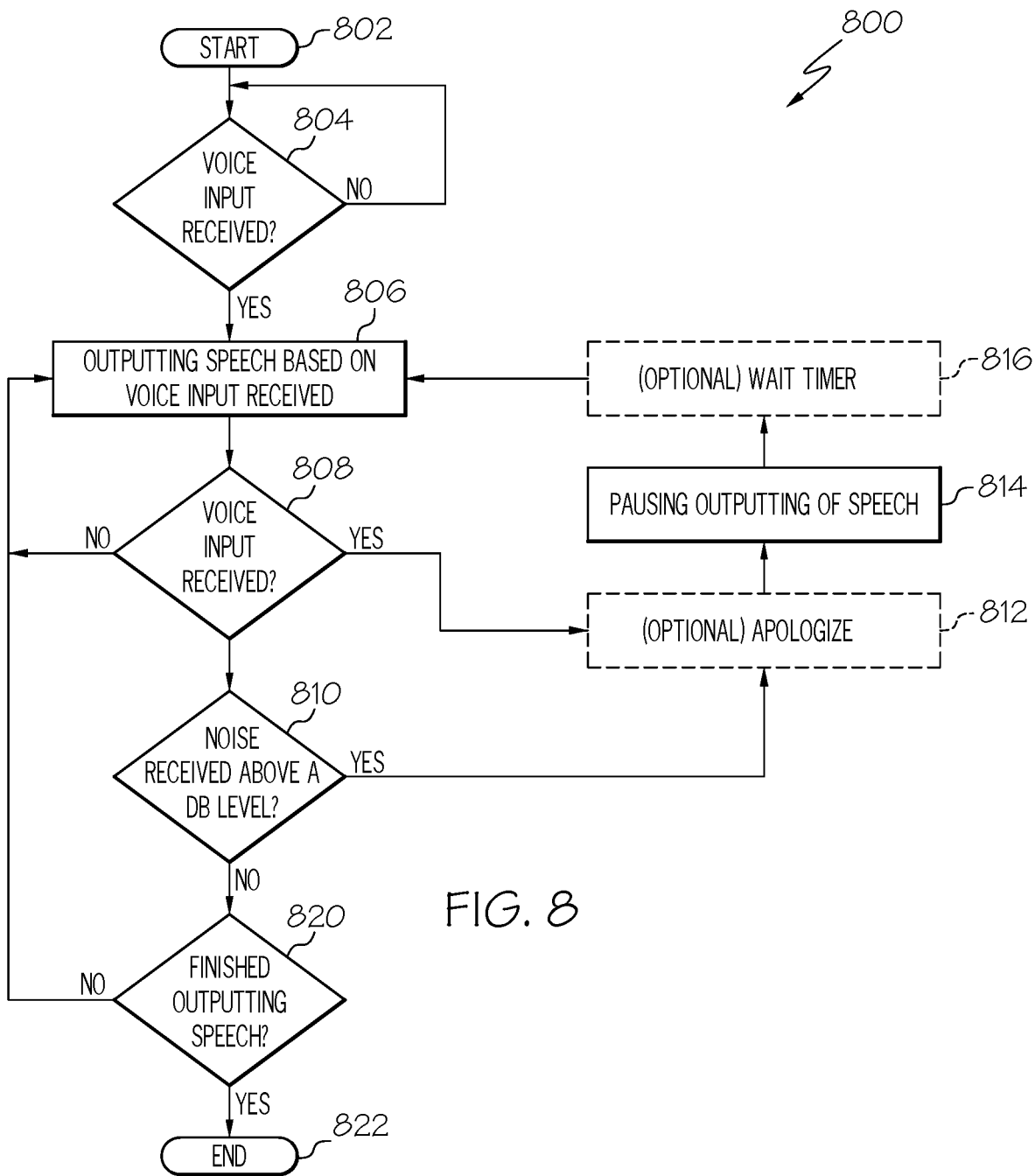
FIG. 8 is a flow chart of a voice controlled device pausing a conversation based on a recognizing a person nearby is speaking or ambient noise.

FIG. 8 is a flow chart 800 of a voice-controlled device 130, 230, 330 pausing a conversation based on a recognizing a person nearby is speaking or the ambient noise level exceeds a threshold. The process begins in step 802 and immediately proceeds to step 804.

Step 804 is used to determine if voice input is received. In the case that no voice input is received, the process loops back to step 802. Otherwise the process continues to step 806.

In step 806, a voice-controlled device 130, 230, 330 begins outputting synthesized speech based on the voice input received. The process continues to step 808.

Step 808 determines if voice input is being received while the voice-controlled device 130, 230, 330 is outputting synthesized speech. In the case where voice input is detected the process flows to step 812 which is further described below. Otherwise the process flows to step 810.

In step 810 a determination is made if noise is received above a give decibel (dB) threshold. In the case noise is received above the threshold the process continues to step 812. Otherwise no voice input is detected and noise is below a threshold, and the process continues to step 806.

The process flows to step 820. A test is made if there is more synthesized speech to output. If synthesized speech is finished, the process terminates in step 822. Otherwise with more synthesized speech to output, the process loops back to step 806.

Step 812 is an optional step. To be polite, the voice-controlled device 130, 230, 330 apologizes for either speaking while another person is speaking or because the noise is so loud that the conversation is being drowned out. The process continues to step 814.

In step 814 the voice-controlled device 130, 230, 330 pauses the outputting of synthesized speech. The process continues to step 816.

Step 816 is an optional step in which a wait timer is set. After a period of time the voice-controlled device 130, 230, 330, returns to step 808.

In step 820 a test is made if more synthesized speech is ready to output. If yes, the process returns to step 806, otherwise the process ends in step 832.

Voice Controlled Device

Figure 9:
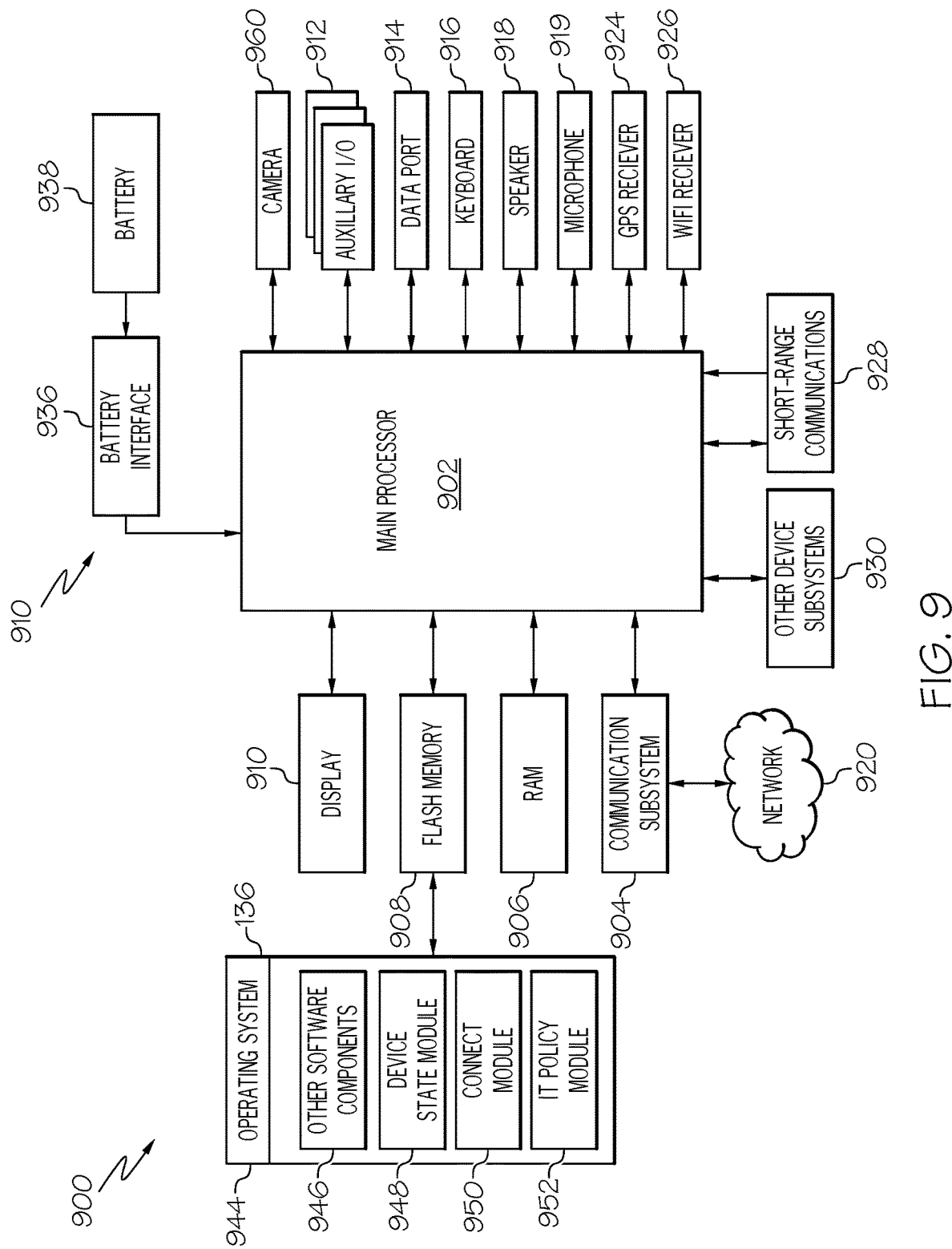
FIG. 9 illustrates one example of a voice controlled device, which may be used to implement the various components/steps shown and described above in the context of FIGS. 1-8 above.

Accordingly, the architecture of a voice-controlled device 130, 230, 330 in FIG. 9 may be used to implement the various components/steps shown and described above in the context of FIGS. 1-8 above.

Referring first to FIG. 9, shown therein is a block diagram of an example embodiment of a voice-controlled device 900. The voice-controlled device 900 comprises a number of components such as a main processor 902 that controls the overall operation of the voice-controlled device 900. Communication functions, including data and voice communications, are performed through a communication subsystem 904. The communication subsystem 904 receives messages from and sends messages to a wireless network 920. In this example embodiment of the voice-controlled device 900, the communication subsystem 904 is configured in accordance with the GSM and GPRS standards, which are used worldwide. Other communication configurations that are equally applicable are the 4G and 5G networks. New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 904 with the wireless network 920 represents one or more different Radio Frequency (RF) channels, operating according to defined protocols specified for GSM/GPRS communications.

The main processor 902 also interacts with additional subsystems such as a Random Access Memory (RAM) 906, a flash memory 908, a display 910, an auxiliary input/output (I/O) subsystem 912 coupled to sensors, a data port 914, a keyboard 916, a speaker 918, a microphone 919, a GPS receiver 924, a Wi-Fi receiver 926, short-range communications 928, a camera 960 and other device subsystems. As will be discussed below, the short-range communications 928 can implement any suitable or desirable device-to-device or peer-to-peer communications protocol capable of communicating at a relatively short range, e.g. directly from one device to another. Examples include Bluetooth, ad-hoc Wi-Fi, infrared, or any "long-range" protocol re-configured to utilize available short-range components. It will therefore be appreciated that short-range communications 928 may represent any hardware, software or combination of both that enable a communication protocol to be implemented between devices or entities in a short range scenario, such protocol being standard or proprietary.

Some of the subsystems of the voice-controlled device 900 perform communication-related functions, whereas other subsystems may provide "resident" or on-device functions. By way of example, the display 910 and the keyboard 916 may be used for both communication-related functions, such as entering a text message for transmission over the network 920, and device-resident functions such as a calculator or task list.

The voice-controlled device 900 can send and receive communication signals over the wireless network 920 after required network registration or activation procedures have been completed. Network access is associated with a subscriber or user of the voice-controlled device 900. The voice-controlled device 900 is typically a battery-powered device and in this example includes a battery interface 936 for receiving one or more rechargeable batteries 930. In at least some embodiments, the battery 938 can be a smart battery with an embedded microprocessor. The battery interface 936 is coupled to a regulator (not shown), which assists the battery 938 in providing power V+ to the voice-controlled device 900. In another example, the voice-controlled device draws power from an A/C connection to household power not show. Although current technology makes use of a battery, future technologies such as micro fuel cells may provide the power to the voice-controlled device 900.

The voice-controlled device 900 also includes an operating system 944 and software components 946 to 956 which are described in more detail below. The operating system 944 and the software components 946 to 956 that are executed by the main processor 902 are typically stored in a persistent store such as the flash memory 908, which may alternatively be a read-only memory (ROM) or similar storage element (not shown). Those skilled in the art will appreciate that portions of the operating system 944 and the software components 946 to 952, such as specific device applications, or parts thereof, may be temporarily loaded into a volatile store such as the RAM 106. Other software components can also be included, as is well known to those skilled in the art.

The subset of software applications 946 that control basic device operations, including data and voice communication applications, may be installed on the voice-controlled device 900 during its manufacture. Software applications may include a device state module 94, a connect module 950 and an IT policy module 952. A device state module 948 provides persistence, i.e. the device state module 948 ensures that important device data is stored in persistent memory, such as the flash memory 908, so that the data is not lost when the voice-controlled device 900 is turned off or loses power. A connect module 950 implements the communication protocols that are required for the voice-controlled device 900 to communicate with the wireless infrastructure and any host system, such as an enterprise system, that the voice-controlled device 900 is authorized to interface with the network 920. An IT policy module 952 receives IT policy data that encodes the IT policy, and may be responsible for organizing and securing rules such as the "Set Maximum Password Attempts" IT policy.

Other types of software applications or components 946 can also be installed on the voice-controlled device 900. These software applications 948 can be pre-installed applications or third party applications, which are added after the manufacture of the voice-controlled device 900. Examples of third party applications include games, calculators, utilities, etc. The additional applications 948 can be loaded onto the voice-controlled device 900 through at least one of the wireless network 920, the auxiliary I/O subsystem 912, the data port 914, the short-range communications subsystem 922, or any other suitable device subsystem.

The data port 914 can be any suitable port that enables data communication between the voice-controlled device 900 and another computing device. The data port 914 can be a serial or a parallel port. In some instances, the data port 914 can be a USB port that includes data lines for data transfer and a supply line that can provide a charging current to charge the battery 930 of the voice-controlled device 900. A GPS receiver 924 is also provided for connecting to a GPS and obtaining location-specific information such as an absolute location or a distance to another location, etc.

For synthesized speech or voice communications, received signals are output to the speaker 918, and signals for transmission are generated by the microphone 919. Although voice or audio signal output is accomplished primarily through the speaker 918, the display 910 can also be used to provide additional information such as the identity of a calling party, duration of a voice call, or other voice call related information.

For composing data items, such as e-mail messages, for example, a user or subscriber could use a touch-sensitive overlay (not shown) on the display 910 that is part of a touch screen display (not shown), in addition to possibly the auxiliary I/O subsystem 912. The auxiliary I/O subsystem 912 may include devices such as: a mouse, track ball, infrared fingerprint detector, or a roller wheel with dynamic button pressing capability. A composed item may be transmitted over the wireless network 920 through the communication subsystem 904.

Synthesized Speech Systems

The software modules 948 and 950 may implement a synthesized speech system. It is desirable for a speech recognition system to successfully identify in real-time, all words that are intelligibly spoken by an individual, independent of noise, vocabulary or context. For example, there may be a number of words that sound acoustically similar, yet in a speech recognition system, determining which word was actually intended is quite important. Also, even when words are correctly recognized, it may not be possible to "ground" (i.e., tie or associate) the word to some specific object based solely on the utterance. Since it is usually vital to perform subsequent actions on the appropriate object in a "command and control" speech application, obtaining the correct word and grounding from the speech recognition system is also desirable and/or necessary.

Conventionally, selecting the transcription for an acoustic fragment corresponding to a word can be done using a rigid grammar. As there are only so many possible choices for each part of a sentence, e.g., when a pizza topping is expected in an order it can be either "anchovies" or "olives" but never "pickles". The list of valid words can even be changed dynamically, e.g., according to what is being sold that week. However, the list of suitable choices can become quite large with no indication of which one in the list of suitable choice is more likely in the current situation. Moreover, just because a word has a low probability does not necessarily mean it is the wrong choice. Therefore, much of the original ambiguity problem remains.

Another common method of choosing between plausible word candidates involves using a statistical n-gram Language Model (LM) for a domain. This provides a likelihood of one word versus another based on the surrounding context of other words. However, a robust LM requires a large amount of data in order to construct, and different LMs are required for different application domains (e.g., "star" in the domain of science is different from that of music and thus the probabilities of observing nearby words like "red giant" vary considerably).

On the semantic side, determining the correct grounding for a phrase can be done through an additional dialog with the user. For example, after hearing "Look at the man with the telescope," the system could ask "You mean look at the man holding the telescope?" However, this question interrupts the original flow of the conversation and takes additional time and is therefore inefficient. As such, it would be desirable if the speech recognition system could automatically determine the correct prepositional phrase binding based on contextual information.

Advantageously, illustrative embodiments of the invention use one or more non-acoustic sensors to improve speech recognition. Furthermore, illustrative embodiments of the invention automatically determine the correct word or phrase based on contextual information.

Examples of the invention resolve speech ambiguities based on what is captured by one or more non-acoustic sensors (e.g., a camera). Illustratively, embodiments of the invention constrain the choice of nouns, proper nouns, adjectives, prepositions, and even verbs and adverbs by assuming the referent is in immediate area. Possible acoustic translations that do not correspond to immediately perceptible properties or feasible actions are rejected. Properties as used herein can be, but not limited to, characteristics such as an object type, name, color, or position. Differentiating properties can also include the relation between a user (not necessarily the speaker) and some object via mechanisms such as gestures (e.g., pointing).

Figure 10:
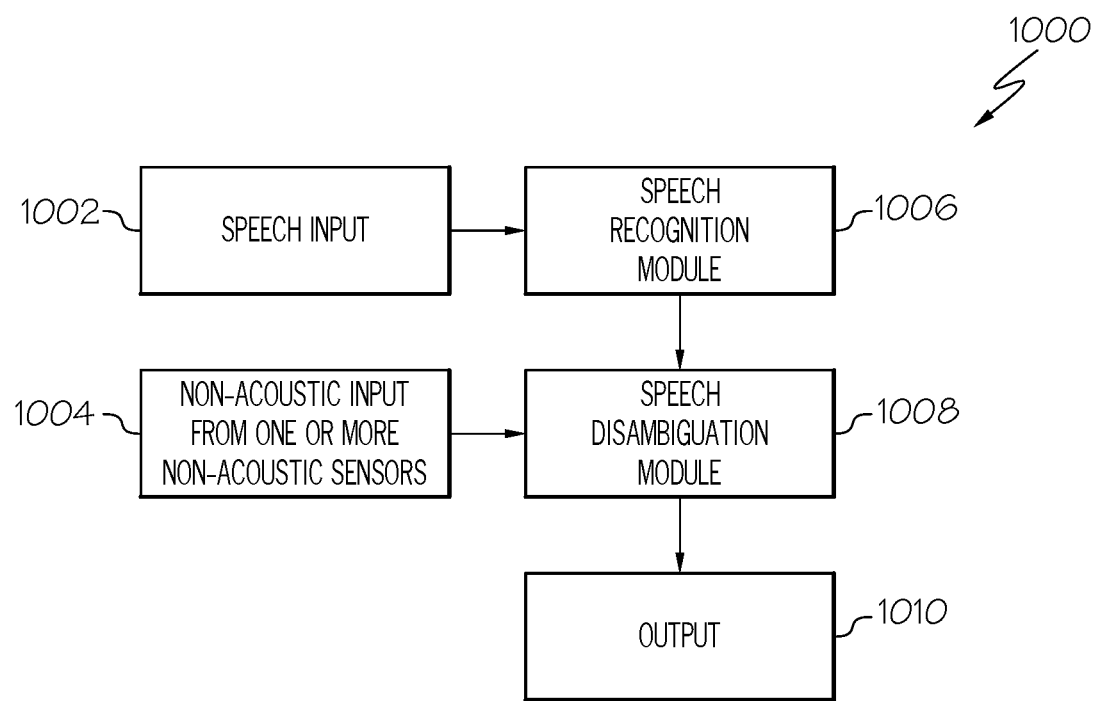
FIG. 10 illustrated a speech recognition system as a sub-system of FIG. 9.

FIG. 10 shows an overview of a speech recognition system according to an embodiment of the invention. Speech recognition system 1000 receives speech input 1002. Speech input 1002 may be received in the form of an audio recording and/or audio signal, and may be captured and transmitted by an audio component of a device such as a microphone 920. Speech input 1002 is then processed by speech recognition module 1006. Speech recognition module 1006 then generates candidate words or phrases based on the received speech input 1002. Speech recognition module 1006 may be implemented using applicable methods, such as, but not limited to, Hidden Markov modeling, deep neural networks, or any suitable statistical-based or rule-based speech recognition algorithm.

Typically, an audio signal in the form of a digitized audio waveform is pre-processed by algorithms such as echo cancellation and spectral subtraction to remove artifacts introduced by the communication channel and/or ambient environment. If multiple audio signals are acquired, a variety of phased-array beam forming techniques can be used to reject sounds not coming from a specific location or direction. Even for the case of a single audio input, there are advanced techniques for blind source separation that can be used to suppress extraneous interference and increase the clarity of the speaker.

After pre-processing, the audio signal is usually converted to a frequency-based representation such as Mel-Frequency Cepstral Coefficients (MFCC). These features are then further augmented by such as overall acoustic volume, fundamental voicing pitch, time derivatives in various frequency bands, or learned features computed over short temporal windows (e.g., Linear Discriminant Analysis). These augmented features are then used to assess the probability that a particular word, phoneme, or phone was heard. In more modern systems, this computation is performed by a specially trained deep neural network. Traditional systems tend to use Gaussian mixture models (GMMs) instead. The neural networks or GMMs may optionally be trained for a specific individual to give improved results. Alternatively, speaker-adaptation may be performed on the augmented features to shift them closer to the values expected of a canonical speaker.

Finally, the probability of hearing particular acoustic fragments is combined with the a priori likelihood of hearing a particular sequence of those fragments to find the overall most probable utterance. This combination is often done using dynamic programming, via a Viterbi or forward-backward algorithm, in a Hidden Markov Model (HMM) where the transition probabilities are governed by a grammar or language model. The candidate words or phrases generated by speech recognition module 1006 are then sent to speech disambiguation module 108 for processing.

Speech disambiguation module 1008 also receives non-acoustic input 1004 for processing. Non-acoustic input 1004 can be received from one or more non-acoustic sensors in the form of a video signal and/or a visual image, e.g., an observed scene. Non-acoustic input 1004 can be captured and transmitted by non-acoustic sensors on a device such as a camera or any other suitable optical sensor. Illustratively, the speech input 1002 may be captured by a microphone and non-acoustic input 1004 may be captured by a camera at the same time or substantially contemporaneously with one another. The camera and microphone may be on the same or different devices. Preferably, the observed scene of non-acoustic input 104 is related to the content and context of speech input 1002. As used herein, "content" refers to a topic of the speech input, and "context" refers to the circumstances, setting or surrounds of the speech input. The speech disambiguation module 1008. The resulting phrase(s) or word(s) from the speech disambiguation module 1008 are then transcribed as text and sent as output 1010 for display on a device or sent as output 1010 for further interpretation as a functional command (e.g., for use by applications or robots that utilize speech recognition for controlling tasks).

Computer Program Product Support

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 11:
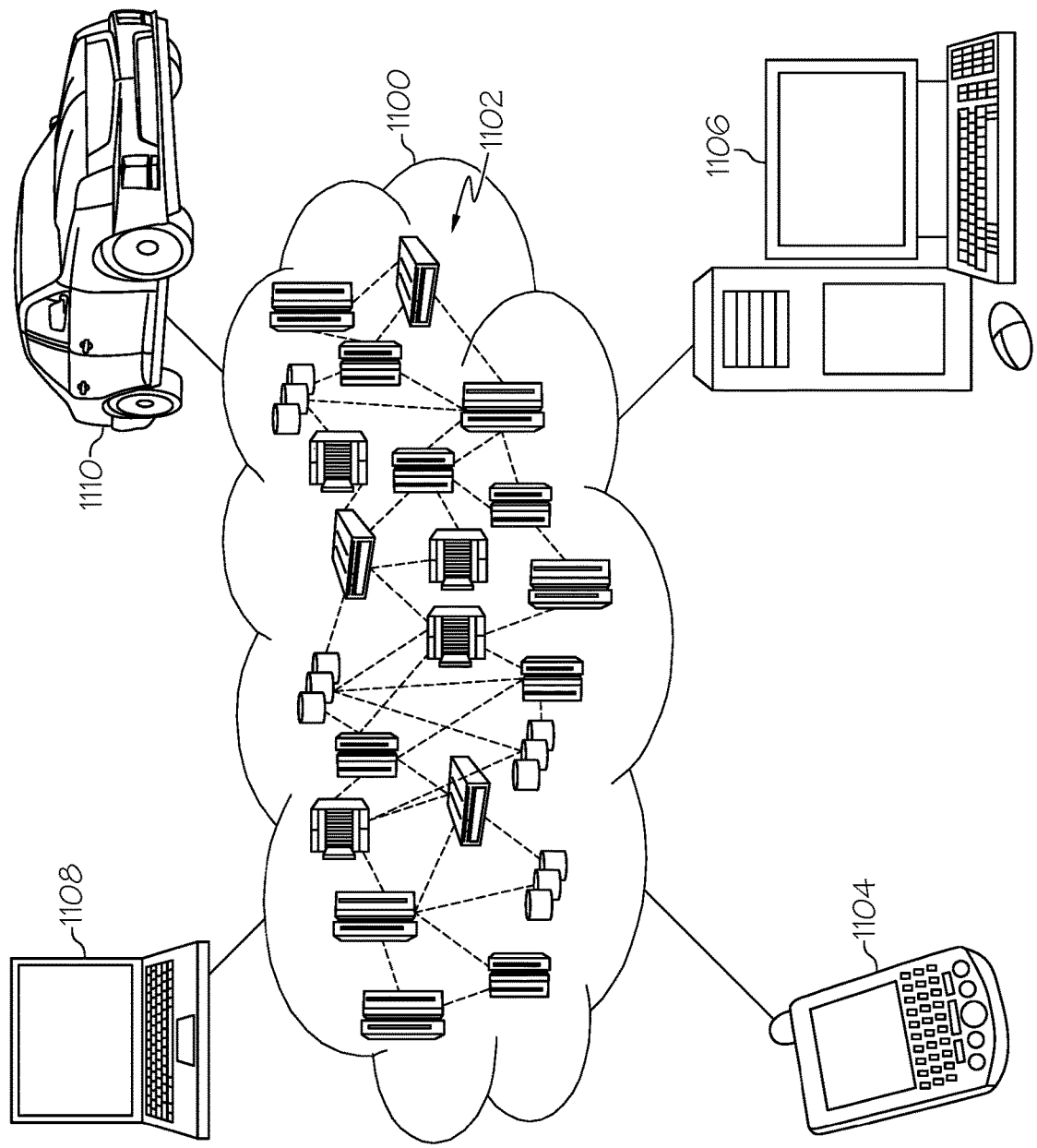
FIG. 11 illustrates one example of a cloud computing environment.

Referring now to FIG. 11, illustrative cloud computing environment 1100 is depicted. As shown, cloud computing environment 1100 comprises one or more cloud computing nodes 1102 with which local computing devices used by cloud consumers, such as, for example, personal digital assistant (PDA) or cellular telephone 1104, desktop computer 1106, laptop computer 1108, and/or automobile computer system 1110 may communicate. Nodes 1102 may communicate with one another. They may be grouped (not shown) physically or virtually, in one or more networks, such as Private, Community, Public, or Hybrid clouds as described hereinabove, or a combination thereof. This allows cloud computing environment 1100 to offer infrastructure, platforms and/or software as services for which a cloud consumer does not need to maintain resources on a local computing device. It is understood that the types of computing devices 1104, 1106, 1108, 1110 shown in FIG. 11 are intended to be illustrative only and that computing nodes 1102 and cloud computing environment 1100 can communicate with any type of computerized device over any type of network and/or network addressable connection (e.g., using a web browser).

Figure 12:
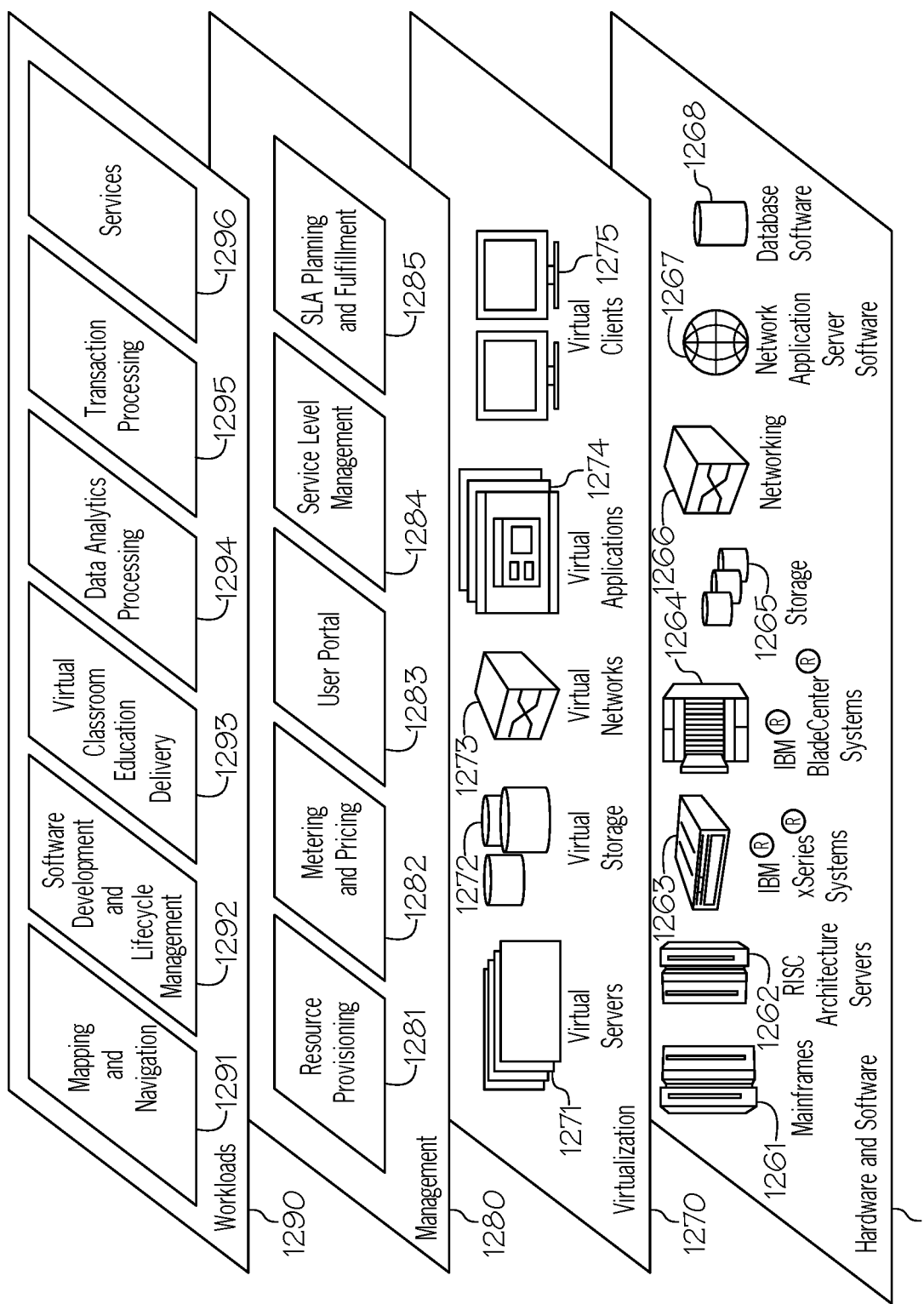
FIG. 12 illustrates abstraction model layers.

Referring now to FIG. 12, an exemplary set of functional abstraction layers provided by cloud computing environment 1100 is shown. It is understood in that the components, layers, and functions shown in FIG. 12 are illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 126. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 783 provides access to the cloud computing environment for consumers and system administrators. Service level management 1284 provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and 1296 for delivering services, such as the services in FIGS. 1-10 above, with a guarantee from a guarantor in accordance with embodiments of the present invention.

Non-Limiting Examples

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method on a voice-controlled device for controlling synthesized speech output, the method comprising:
    recognizing speech input is being received;
    outputting synthesized speech based on the speech input;
    capturing audio input while outputting synthesized speech;
    in response to the captured audio is recognized as speech, then pausing the outputting of synthesized speech;
    detecting, with at least one sensor, whether more than one person is within a first settable distance from the voice-controlled device; and
    determining that more than one person is detected and recognizing that an attention word is received before resuming outputting synthesized speech based on the speech input.

2. The computer-implemented method of claim 1, further comprising:

filtering out the outputting of synthesized speech from the audio input.

3. The computer-implemented method of claim 1, further comprising:
    in response to the captured audio being not recognized as speech and a volume of the audio input below or equal to a settable background noise threshold, and the pausing of the outputting of synthesized speech being within a settable pause timeframe, resuming the outputting of synthesized speech based on the speech input.

4. The computer-implemented method of claim 1, further comprising:
    detecting, with at least one of a camera sensor, an infra-red sensor, a depth sensor, a laser-pulse based radar sensor, an acoustic sensor, or a combination thereof, whether one person or more than one person is within a first settable distance from the voice-controlled device;
    in response to only one person being detected within the first settable distance, begin outputting synthesized speech based on the speech input without waiting for an attention word to be recognized and otherwise wait for additional criteria before outputting synthesized speech based on the speech input.

5. The computer-implemented method of claim 1, wherein the-detecting, with at least one sensor includes detecting, with at least one at least one of a camera sensor, an infra-red sensor, a depth sensor, a laser-pulse based radar sensor, an acoustic sensor, or a combination thereof.

6. The computer-implemented method of claim 5, wherein in response to more than one person being detected, further comprising:
    determining that one person of the more than one person being detected is within a second settable distance from the voice-controlled device and determining that the one person is looking at the voice-controlled device before resuming outputting synthesized speech based on the speech input.

7. The computer-implemented method of claim 6, wherein the second settable distance is closer to the voice-controlled device as compared with the first settable distance.

8. The computer-implemented method of claim 6, wherein the voice-controlled device is a robot with eyes and in response to the one person looking at the eyes of the robot before outputting synthesized speech based on the speech input.

9. A voice-controlled device for controlling synthesized speech output, the voice-controlled device comprising:
    a processor device; and
    a memory operably coupled to the processor device and storing computer-executable instructions causing:
        recognizing speech input is being received;
        outputting synthesized speech based on the speech input;
        capturing audio input while outputting synthesized speech;
        in response to the captured audio is recognized as speech, pausing the outputting of synthesized speech;
        detecting, with at least one sensor, whether more than one person is within a first settable distance from the voice-controlled device; and determining that more than one person is detected and recognizing that an attention word is received before resuming outputting synthesized speech based on the speech input.

10. The voice-controlled device of claim 9, further comprising:
filtering out the outputting of synthesized speech from the audio input.

11. The voice-controlled device of claim 9, further comprising:
in response to the captured audio being not recognized as speech and a volume of the audio input below or equal to a settable background noise threshold, and the pausing of the outputting of synthesized speech being within a settable pause timeframe, resuming the outputting of synthesized speech based on the speech input.

12. The voice-controlled device of claim 9, further comprising:
detecting, with at least one of a camera sensor, an infra-red sensor, a depth sensor, a laser-pulse based radar sensor, an acoustic sensor, or a combination thereof, whether one person or more than one person is within a first settable distance from the voice-controlled device;
in response to only one person being detected within the first settable distance, begin outputting synthesized speech based on the speech input without waiting for an attention word to be recognized and otherwise wait for additional criteria before outputting synthesized speech based on the speech input.

13. The voice-controlled device of claim 9, wherein the-detecting, with at least one sensor includes detecting, with at least one at least one of a camera sensor, an infra-red sensor, a depth sensor, a laser-pulse based radar sensor, an acoustic sensor, or a combination thereof.

14. The voice-controlled device of claim 13, wherein in response to more than one person being detected, further comprising:
determining that one person of the more than one person being detected is within a second settable distance from the voice-controlled device and determining that the one person is looking at the voice-controlled device before resuming outputting synthesized speech based on the speech input.

15. The voice-controlled device of claim 14, wherein the second settable distance is closer to the voice-controlled device as compared with the first settable distance.

16. The voice-controlled device of claim 14, wherein the voice-controlled device is a robot with eyes and in response to the one person looking at the eyes of the robot before outputting synthesized speech based on the speech input.

17. A computer program product for controlling synthesized speech output in a voice-controlled device, the computer program product comprising:
a non-transitory computer readable storage medium readable by a processing device and storing program instructions for execution by the processing device, said program instructions comprising:
recognizing speech input is being received;
outputting synthesized speech based on the speech input;
capturing audio input while outputting synthesized speech;
detecting, with at least one sensor, whether more than one person is within a first settable distance from the voice-controlled device; and
determining that more than one person is detected and recognizing that an attention word is received before resuming outputting synthesized speech based on the speech input.

18. The computer program product of claim 17, further comprising:
filtering out the outputting of synthesized speech from the audio input.

19. The computer program product of claim 17, further comprising:
in response to the captured audio being not recognized as speech and a volume of the audio input below or equal to a settable background noise threshold, and the pausing of the outputting of synthesized speech being within a settable pause timeframe, resuming the outputting of synthesized speech based on the speech input.

20. The computer program product of claim 17, wherein the-detecting, with at least one sensor includes detecting, with at least one at least one of a camera sensor, an infra-red sensor, a depth sensor, a laser-pulse based radar sensor, an acoustic sensor, or a combination thereof.

* * * * *